Patented Feb. 1, 1938

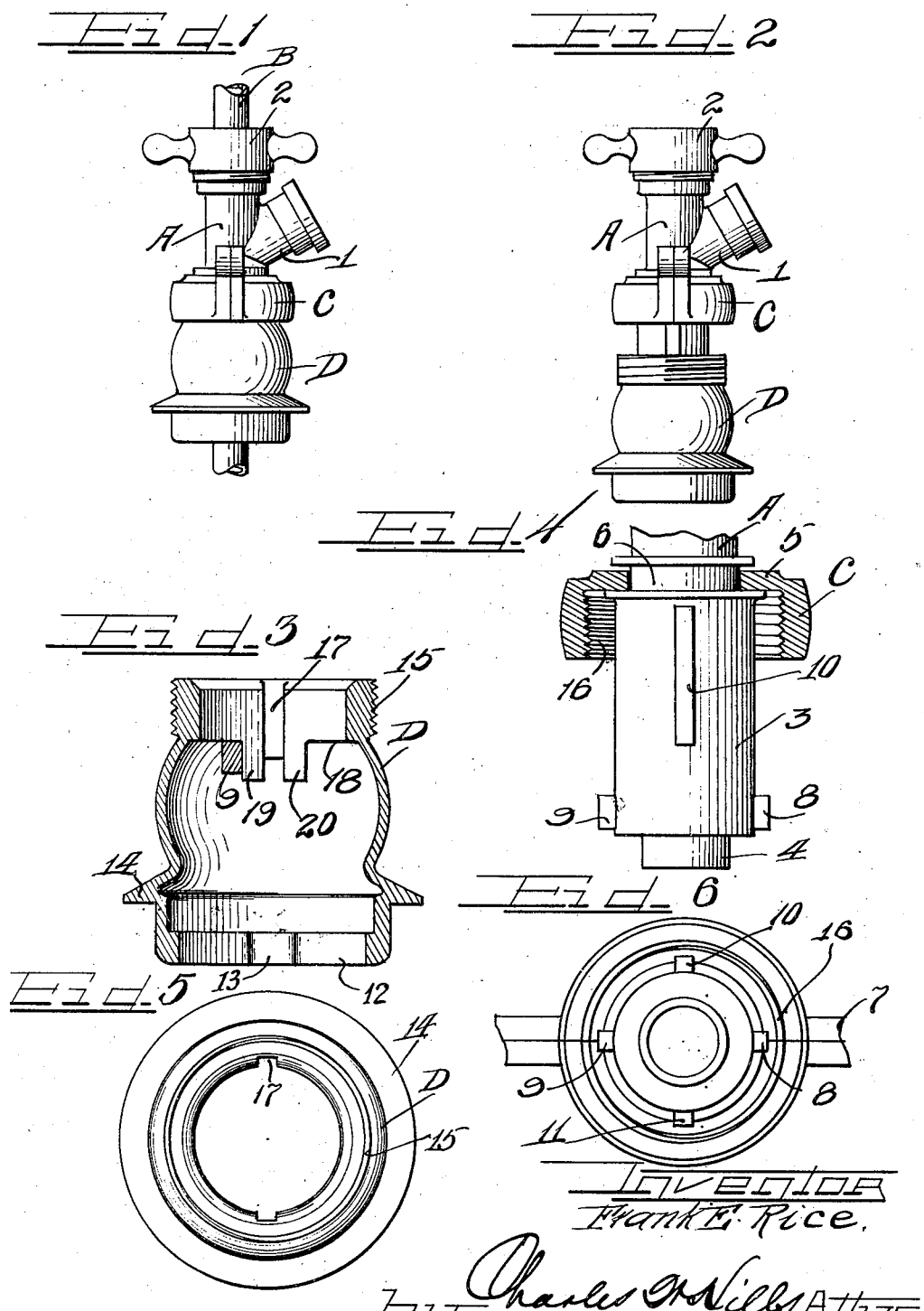

2,107,164

UNITED STATES PATENT OFFICE

2,107,164

TAP CONSTRUCTION

Frank E. Rice, Detroit, Mich., assignor to American Tap-Bush Company, Detroit, Mich., a corporation of Delaware Application February 28, 1936, Serial No. 66,216
Renewed June 5, 1937

6 Claims. (Cl. 285—40)

The present invention relates to tap construction and more particularly to construction of taps utilized for beer or other barrels, and to means whereby loss of the attaching sleeve is prevented when the sleeve is separated from the means coupling it to the tap.

It has been found from experience that beer barrel and like taps made with separable sleeves, frequently when removed from barrels, have the sleeve separated from the tap so as to become lost.

The present invention has for an object the provision of means whereby a beer barrel tap, such as the "Peerless" type is provided with means for preventing separation of the sleeve from the tap when the coupling ring is disconnected from the sleeve.

Another object of the present invention is to provide a beer barrel tap, of the separable sleeve type, with means for preventing loss of the sleeve from the tap when the means for connecting the sleeve to the tap is disconnected from the sleeve.

A further object of the present invention is to improve tap construction generally.

The above, other and further objects of the present invention will be apparent from the following description and accompanying drawing.

An embodiment of the present invention is illustrated in the accompanying drawing, and the views thereof are as follows:

Figure 1 is a side elevational view of a beer barrel tap constructed in accordance with the principles of the present invention and showing the sleeve as it appears when connected in position to secure the tap to a barrel and support a pump rod.

Figure 2 is an elevational view of a tap constructed in accordance with the principles of the present invention, showing the coupling sleeve disconnected from the coupling ring yet retained on the tap against loss.

Figure 3 is an enlarged axial sectional view through the sleeve of the present invention.

Figure 4 is an enlarged fragmental elevational view, partially in section of that portion of the tap which receives the coupling sleeve, showing the connecting ring in section, rotatably but not axially movable on the tap, and lugs for cooperating with the sleeve in various manners.

Figure 5 is a top plan view of the coupling sleeve showing the diametrically opposite slots therein for cooperating with the lugs on the tap body.

Figure 6 is a bottom plan view of the tap body especially of Figure 4.

The drawing will now be explained.

The form of tap herein illustrated comprises the usual body A having a lateral connection 1 for an air hose, a top nut 2 which is adapted to compress a washer about the pump tube B in the usual manner. The lower end of the tap has an elongated cylindrical part 3 with a reduced extremity 4 for receiving a usual washer which is clamped between the tap and the bush when the tap is attached to a bush in well known manner.

A coupling ring C is rotatably but non-axially movably mounted on the tap A with a flange 5 thereof entered in a groove 6 formed in the tap body. Coupling ring C is preferably made of two split halves secured together by means of rivets which pass through the wings 7 of the coupling ring.

Formed on the portion 3 of the body, adjacent its lower end, are two diametrically opposed lugs 8 and 9 of comparatively short axial length. Also formed on the portion 3 of the body are two diametrically opposed axially extending lugs 10 and 11, of substantial length and illustrated as slightly longer than half the length of the portion 3 of the tap. Lugs 10 and 11 are angularly and axially spaced with respect to the first lugs mentioned, that is, lugs 8 and 9.

The sleeve D has its lower end provided with a central opening 12 for surrounding the neck of a tap bush, and with the usual inwardly projecting lug 13 for effecting bayonet connection with the bush, in a manner well understood. The sleeve is provided with an outward annular flange 14 for overlying the outer end of the bush to position the connected cap rigidly in position. The upper end of the sleeve has a threaded neck 15 which enters the interiorly threaded portion 16 of the coupling ring C. Interiorly of the neck 15 and at two diametrically opposite points, axially extending notches or slots 17 are formed in the sleeve. The neck portion of the sleeve is thickened thus providing a shoulder 18 at the lower inward part of the thickened portion. In the formation of the sleeve, extensions 19 and 20 are cast with the sleeve to form elongations of the slots extending below the shoulder 18 of the sleeve.

The sleeve D is connected to the tap A by engaging the slots 17 over the lugs 8 and 9 at the lower extremity of the portion 3 of the tap, and then after the slots clear these lugs, the sleeve is given a turn of substantially 90° until the slots 17 engage the lugs 10 and 11 whereupon the sleeve is pushed along the tap until in position to be threadedly engaged by the coupling ring C. The fact that the lugs 10 and 11 are of substantial length assures that, at all times, while the threaded neck 15 of the sleeve is within position to be threadedly engaged by the neck C, the slots 17 of the sleeve will be in engagement with the lugs 10 and 11, thus permitting axial but preventing rotative movement between the sleeve and the tap body.

The tap, with its sleeve, is connected to a tap bush by loosening the ring C with respect to the sleeve, and dropping the sleeve until there is sufficient space between the top inward surfaces of the lugs 13 and the under surfaces of the overhanging shoulders or ledges in the bush as is well understood. The lugs 13 are then engaged under such ledges and the tap as a whole given rotative movement whereupon the ring C is rotated in such direction as to move the tap body downwardly against the tap bush and raise the sleeve D so that a clamping effect against the flanges of the bush will be accomplished. It is to be understood that when such a tap is applied to a bush, the usual washer, not shown, is applied about the reduced extremity of the tap bush body, and it is this washer which rests against the outer surface of the tap bush.

Should it so happen that when the tap of the present invention is disconnected from the bush, and the sleeve D becomes disconnected from the coupling ring C, the sleeve will fall until the shoulder thereof engages the lugs 8 and 9, thus preventing accidental displacement of the sleeve D from the tap bush, and thereby preventing loss of such sleeve. Fig. 3 shows the manner of engagement of one of lugs 8 or 9 with the shoulder 18 of the sleeve when the sleeve is disconnected from the coupling ring and dropped as shown in Fig. 2.

In order to remove the sleeve D from the top bush body, it must be manipulated and rotated so as to straddle the lugs 8 and 9 by the extensions 19 and 20 of the notches 17, which can be done by manipulation of the sleeve. When the notches 17 are engaged with the lugs 8 and 9, the sleeves thereupon may be very readily removed from the tap body.

While the present invention has been illustrated in connection with a tap of the well known "Peerless" type, it is of course applicable to any other kind of tap where the connecting sleeve is formed as a part separate from the tap body and in which a coupling ring, or equivalent means may be employed for connecting the sleeve to the tap body for connecting the tap in operative association with a bush.

The invention has been described herein more or less precisely as to details, yet it is to be understood that the invention is not to be limited thereby as changes may be made in the arrangement and proportion of parts, and equivalents may be substituted, without departing from the spirit and scope of the invention.

The invention is claimed as follows:

1. A beer barrel or like tap comprising a tap body and a removable connecting sleeve, said tap body having on it two pairs of lugs, the lugs of each pair being diametrically opposite each other, the lugs of one pair being angularly and axially spaced with respect to the other pair, said sleeve having two diametrically opposed interior notches or grooves adapted to pass over one pair of lugs when the sleeve is applied to the body and to receive the other pair of lugs after application to the body and when in position for attachment to the body, connecting means on said body for securing said sleeve to it in tap attaching position, the engagement of said notches with said other lugs preventing relative rotation of the sleeve and body during attachment and detachment of the sleeve and body, and said one pair of lugs preventing accidental loss of the sleeve from the body when the sleeve is separated from its attaching means.

2. A beer barrel or like tap comprising a body and a separable connecting sleeve, said sleeve having notches or grooves formed in its interior surface and extending inwardly from one end thereof, the other end of said sleeve being adapted for connection to a tap bush, said body having a part enterable within said sleeve and provided with lugs near its entering end for passage through said grooves and after passage and rotative movement of said sleeve to underlie a shoulder formed within said sleeve, said body also having other lugs angularly and axially spaced from said first mentioned lugs enterable into said grooves when the sleeve and body are in position for connection to prevent relative rotation thereof during connection, and a ring rotatably carried by said body and adapted for threaded connection to said sleeve to connect said tap to a bush, said first lugs serving to prevent separation of the sleeve from the body when said ring is disconnected from said sleeve.

3. A beer barrel tap including a tap body, an attaching sleeve adapted to engage a tap bush, and a threaded ring for connecting said sleeve to the body, said sleeve and body having cooperating means to prevent the removal of the sleeve from the body when the sleeve is disconnected from the ring and occupies one angular position on said tap and to permit removal of said sleeve from said tap when said sleeve is in a different angular position.

4. A beer barrel tap including a tap body, an attaching sleeve adapted to engage a tap bush, a threaded ring for connecting said sleeve to said body, said sleeve and body having cooperating means to prevent relative rotation of the sleeve and body during connection and disconnection of the ring and sleeve, and other means to prevent separation of the sleeve from the body when said sleeve is disconnected from said ring and occupies one angular position on said tap and to permit removal of said sleeve from said tap when said sleeve is in a different angular position.

5. A beer barrel tap including a tap body, an attaching sleeve adapted to engage a tap bush, a threaded ring for connecting said sleeve to said body, said body having an axially extending lug and said sleeve having an internally formed axially extending recess to engage said lug to prevent relative rotation of the sleeve and body during application of the tap to a bush, said body having another lug angularly and axially spaced from said first lug engageable by said recess for application and removal of the sleeve to said body and positioned to prevent separation of the sleeve from the body when said sleeve is disconnected and dropped free of engagement with said ring.

6. A beer barrel tap including a tap body, an attaching sleeve adapted to engage a tap bush loose on said body, a threaded ring rotatably but non-axially movable on said body for connecting said sleeve to the body, said sleeve having an internal annular shoulder which is axially notched or recessed at two diametrical opposite points, lugs projecting below said shoulder and defining extensions of said notches or recesses, two lugs on said body near the lower end thereof adapted to enter said notches or recess of the sleeve when the sleeve is applied to the body and to project under said shoulder when said sleeve is applied to said body and rotated on said body, and other lugs engageable by said sleeve notches for preventing rotative movement of said sleeve when said ring is connected to said sleeve for securing said body and sleeve in operative position on a tap bush.

FRANK E. RICE.